(12) United States Patent
Valérie (10) Patent No.: US 9,617,665 B2
(45) Date of Patent: Apr. 11, 2017

(54) HYBRID TANK WALL FOR HIGH PERFORMANCE CRASH RESISTANT TANKS

(71) Applicant: ZODIAC AEROSAFETY SYSTEMS, Caudebec-les-Elbeuf (FR)

(72) Inventor: Briand Valérie, Saint-Ouen-du-Tilleul (FR)

(73) Assignee: Zodiac Aerosafety Systems, Caudebec-les-Elbeuf (FR)

(*) Notice: Subject to any disclaimer, the term of this patent is extended or adjusted under 35 U.S.C. 154(b) by 679 days.

(21) Appl. No.: 13/930,054

(22) Filed: Jun. 28, 2013

(65) Prior Publication Data

US 2015/0361596 A1    Dec. 17, 2015

Related U.S. Application Data

(60) Provisional application No. 61/665,948, filed on Jun. 29, 2012.

(51) Int. Cl.
*D03D 15/00* (2006.01)
*D03D 1/04* (2006.01)
(Continued)

(52) U.S. Cl.
CPC ......... *D03D 1/04* (2013.01); *B60K 15/03177* (2013.01); *D02G 3/442* (2013.01); *D03D 1/0041* (2013.01); *D03D 11/00* (2013.01); *D03D 13/008* (2013.01); *D03D 15/00* (2013.01); *D03D 15/0011* (2013.01); *D03D 15/0027* (2013.01); *B60K 2015/03375* (2013.01); *B60K 2015/03407* (2013.01); *B60K 2015/03493* (2013.01); *B60Y 2200/24* (2013.01); *B60Y 2200/51* (2013.01); *B60Y 2200/52* (2013.01); *D03D 2700/0137* (2013.01); *D03D 2700/0148* (2013.01); *D03D 2700/03* (2013.01); *D10B 2331/021* (2013.01); *Y10T 428/1314* (2015.01); *Y10T 428/1362* (2015.01); *Y10T 428/249921* (2015.04)

(58) Field of Classification Search
CPC .................................. D03D 15/00; D03D 1/04
See application file for complete search history.

(56) References Cited

U.S. PATENT DOCUMENTS 3,796,035 A * 3/1974 Watson ................... D02G 1/18
28/283
6,668,868 B2 * 12/2003 Howland ......... A41D 19/01505
139/383 R (Continued)

FOREIGN PATENT DOCUMENTS

DE       9114628 U1    2/1992
DE       4243465 A1    7/1993
(Continued)

OTHER PUBLICATIONS

PCT/IB2013/055335, Invitation to Pay Additional Fees and, Where Applicable, Protest Fee (Form PCT/ISA/206) and Partial International Search Report (Annex to Form PCT/ISA/206), dated Feb. 25, 2014, 5 pages.

(Continued)

*Primary Examiner* — Andrew Piziali
(74) *Attorney, Agent, or Firm* — Kilpatrick Townsend & Stockton LLP; Dean W. Russell; Kristin M. Crall (57) ABSTRACT

Embodiments of the present invention relate generally to reinforcement materials for use in reinforcing flexible tank walls, and particularly to hybrid textiles and weaving patterns that have been found particularly useful with such hybrid textiles.

22 Claims, 9 Drawing Sheets

(51) Int. Cl.
*B60K 15/03* (2006.01)
*D02G 3/44* (2006.01)
*D03D 1/00* (2006.01)
*D03D 11/00* (2006.01)
*D03D 13/00* (2006.01)

(56) References Cited

U.S. PATENT DOCUMENTS

| | | | |
|---|---|---|---|
| 8,555,472 B2 * | 10/2013 | Cavallaro | D03D 1/0052 139/408 |
| 2006/0089069 A1 | 4/2006 | Allen et al. | |
| 2008/0072984 A1 | 3/2008 | Branch et al. | |
| 2011/0129657 A1 | 6/2011 | Clough | |

FOREIGN PATENT DOCUMENTS

| | | |
|---|---|---|
| FR | 2921798 A1 | 4/2009 |
| WO | 02/18687 A2 | 3/2002 |

OTHER PUBLICATIONS

PCT/IB2013/055335, Search Report and Written Opinion dated Jun. 4, 2014, 18 pages.
International Patent Application No. PCT/IB2013/055335, International Preliminary Report on Patentability dated Jan. 8, 2015.

\* cited by examiner

|   |   | 1 | 2 | 3 | 4 | 5 | 6 | 7 | 8 | 9 | 10 | 11 | 12 | 1 | 2 |
|---|---|---|---|---|---|---|---|---|---|---|----|----|----|---|---|
|   |   | K | K | P | P | P | P | K | K | P | P  | P  | P  | K | K |
| 1 | K | X |   | X |   | X |   | X |   | X |    | X  |    | X |   |
| 2 | K |   | X |   | X |   | X |   | X |   | X  |    | X  |   | X |
| 3 | P | X |   |   | X | X | X | X |   |   |    |    |    | X |   |
| 4 | P |   | X | X | X | X | X |   | X |   |    |    |    |   | X |
| 5 | P | X |   | X | X | X | X | X |   |   |    |    |    | X |   |
| 6 | P |   | X | X | X | X |   |   | X |   |    |    |    |   | X |
| 7 | K | X |   | X |   | X |   |   | X |   | X  |    | X  |   |   |
| 8 | K |   | X |   | X |   | X | X |   |   |    | X  |    | X | X |
| 9 | P | X |   |   |   |   |   | X |   | X | X  | X  | X  | X |   |
| 10| P |   | X |   |   |   |   |   | X | X | X  | X  | X  |   | X |
| 11| P | X |   |   |   |   |   | X |   | X | X  | X  | X  | X |   |
| 12| P |   | X |   |   |   |   | X | X | X | X  | X  |    |   | X |
| 1 | K | X |   | X |   | X |   | X |   | X |    | X  |    | X |   |
| 2 | K |   | X |   | X |   | X |   | X |   | X  |    | X  |   | X |

FIG. 8

|   |   | 1 | 2 | 3 | 4 | 5 | 6 | 7 | 8 | 9 | 10 | 11 | 12 | 1 | 2 |
|---|---|---|---|---|---|---|---|---|---|---|----|----|----|---|---|
|   |   | K | K | P | P | P | P | K | K | P | P  | P  | P  | K | K |
| 1 | K | X | X |   |   | X | X |   |   | X | X  |    |    | X | X |
| 2 | K | X | X |   |   | X | X |   |   | X | X  |    |    | X | X |
| 3 | P |   |   | X | X | X | X | X | X |   |    |    |    |   |   |
| 4 | P |   |   | X | X | X | X | X | X |   |    |    |    |   |   |
| 5 | P | X | X | X | X | X | X |   |   |   |    |    |    | X | X |
| 6 | P | X | X | X | X | X | X |   |   |   |    |    |    | X | X |
| 7 | K |   |   | X | X |   |   | X | X |   |    | X  | X  |   |   |
| 8 | K |   |   | X | X |   |   | X | X |   |    | X  | X  |   |   |
| 9 | P | X | X |   |   |   |   |   |   | X | X  | X  | X  | X | X |
| 10| P | X | X |   |   |   |   |   |   | X | X  | X  | X  | X | X |
| 11| P |   |   |   |   |   |   | X | X | X | X  | X  | X  |   |   |
| 12| P |   |   |   |   |   |   | X | X | X | X  | X  | X  |   |   |
| 1 | K | X | X |   |   | X | X |   |   | X | X  |    |    | X | X |
| 2 | K | X | X |   |   | X | X |   |   | X | X  |    |    | X | X |

Table 1 : Typical tensile properties of high modulus yarns usually used for composites (not exhaustive list)

| Properties | Unit | Carbon | | PE HT | | Para-aramide | | | | Glass | | |
|---|---|---|---|---|---|---|---|---|---|---|---|---|
| | | HM Carbon | HS Carbon | Dyneema UHMW | | Kevlar | | Twaron | Technora | S-Glass | R-Glass | E-Glass |
| | | HM40 | T700S | SK75 - SK78 | SK 25 | 49 | 29 | 1014 | T240 | X-Strand | | |
| Density | / | 1,81 | 1,8 | 0,97-0,98 | 0,97-0,98 | 1,44 | 1,44 | 1,44 | 1,39 | 2,45 | 2,53 | 2,6 |
| Tenacity | cN/Tex | 151 | 272 | 340 - 400 | 220 | 208 | 203 | 220 | 250 | 150 | 130 | 96 |
| Breaking elongation | % | 0,7 | 2,1 | 3 - 4 | 3 - 4 | 2,4 | 3,6 | 3,6 | 4,6 | 5,4 | 3,3 | 3,5 |
| Modulus | GPa | 392 | 230 | 109 - 132 | 52 | 112,4 | 70,5 | 74 | 73,7 | 92 | 86 | 73 |
| Specific Modulus | GPa | 216,57 | 127,78 | 123,59 | 53,33 | 78,06 | 48,96 | 51,39 | 53,02 | 37,55 | 33,99 | 28,08 |

Figure 16:
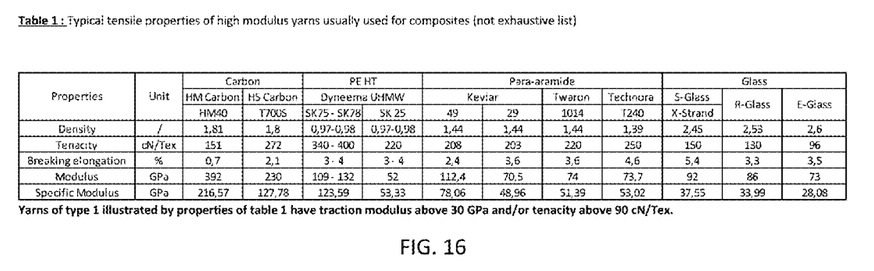
FIGS. 16 and 17 are tables showing exemplary properties for yarns described herein.

Yarns of type 1 illustrated by properties of table 1 have traction modulus above 30 GPa and/or tenacity above 90 cN/Tex.

FIG. 16

Table 2: Tensile properties of yarns usually used for technical flexible structures (not exhaustive list)

| Properties | Unit | Meta-aramide | Pa 6.6 HT | PES HT | PEEK Zyex Mono | Teflon | PP HT |
|---|---|---|---|---|---|---|---|
| Density | / | 1,34 | 1,14 | 1,38 | 1,3 | 2,16 | 0,91 |
| Tenacity | cN/Tex | 40 - 44 | 84 | 70 | 18 | 36 | 80 |
| Breaking elongation | % | 18 -19 | 20 | 16 | 40 | 35 | 15,5 |
| Modulus | GPa | 3,2 - 4,3 | 6 | 13,8 | / | / | 6,4 |
| Specific Modulus | GPa | 2,80 | 5,26 | 10,00 | / | / | 7,03 |

Figure 17:
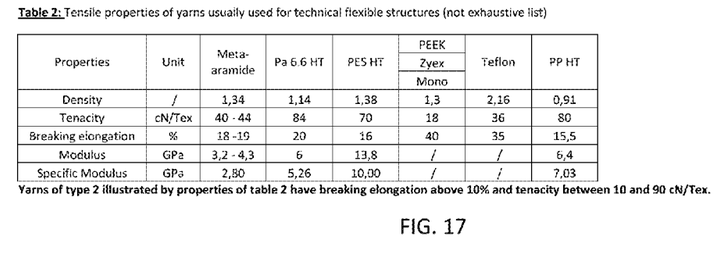

Yarns of type 2 illustrated by properties of table 2 have breaking elongation above 10% and tenacity between 10 and 90 cN/Tex.

FIG. 17

HYBRID TANK WALL FOR HIGH PERFORMANCE CRASH RESISTANT TANKS

CROSS REFERENCE TO RELATED APPLICATIONS

This application claims the benefit of U.S. Provisional Application Ser. No. 61/665,948, filed Jun. 29, 2012, titled "Hybrid Tank Wall for High Performance Crash Resistant Tanks," the entire contents of which are hereby incorporated by reference.

FIELD OF THE INVENTION

Embodiments of the present invention relate generally to reinforcement materials for use in reinforcing flexible fuel tank walls, and particularly to hybrid textiles and weaving patterns that have been found particularly useful with such hybrid textiles.

BACKGROUND

There are certain government standards regulating flexible fuel tanks for use in various vehicles, such as armored vehicles, tanks, and race cars; aircraft such as helicopters, commercial and private aircraft, tactile missiles, and other aerospace vehicles; marine craft; and other vehicles. Flexible tanks must be able to withstand certain crash parameters, such that they limit rupturing of the tank and the consequent dangers associated therewith. Flexible fuel tanks for use in the aviation field, particularly for crash worthy helicopters applications, are often made of rubber-coated fabric. One of the benefits of flexible fuel tanks is that they can be generally crash resistant. They may also be shaped into empty available spaces in the fuselage, wings, or bays of the aircraft.

In some instances, rubber-coated fabrics such as polyamide or polyester may be applied to the outer portion of a tank, but these materials add weight to the system, which is undesirable in many instances. Accordingly, the present inventor has developed a hybrid textile that has a reduced weight, without sacrificing strength, crash resistance and flexibility.

BRIEF SUMMARY

Embodiments of the invention described herein thus provide a hybrid mix of yarns that have different properties. The two different types of yarns are mixed or woven together in various weight proportions and in various patterns in order to meet the desired strength, crash resistance, flexibility, or other parameters or specifications. Embodiments also relate to unique weaving patterns that have particular use in connection with flexible tank walls.

DETAILED DESCRIPTION

Figure 1:
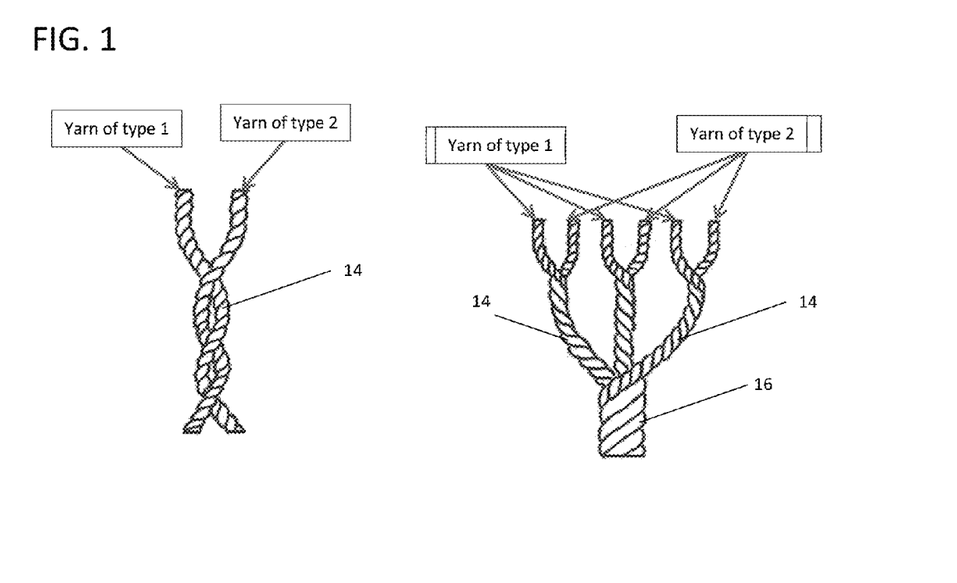
FIG. 1 shows a side plan view of two types of yarn being twisted together according to various embodiments of the invention.
Figure 2:
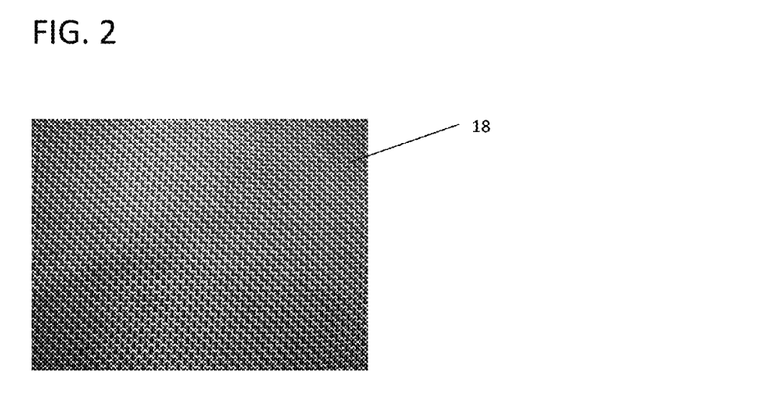
FIG. 2 shows a top plan view of one type of woven fabric.
Figure 3:
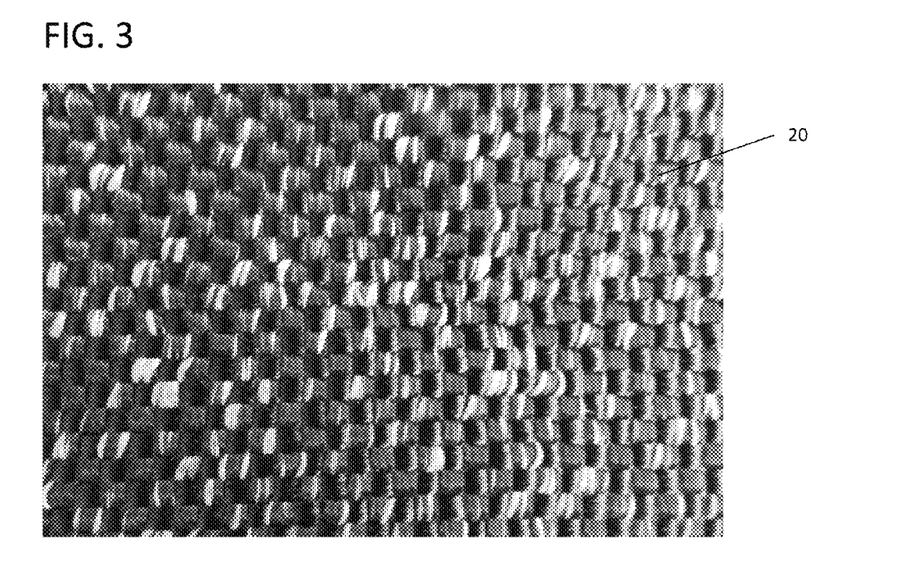
FIG. 3 shows a top plan view of a woven fabric using yarns described herein.

One embodiment of the present invention provides a hybrid textile made. In one embodiment, the hybrid textile comprises a high modulus yarn of Type 1 and a technical yarn of Type 2. The hybrid textile is particularly useful as a reinforcement for a flexible tank wall. The material is formed by weaving or mixing portions of type 1 and type 2 yarns together in order to form a hybrid material. Examples of such hybrid materials are shown in FIGS. 1-3. (Other embodiments of the invention, described further below, relate to various weaving patterns that may be used with either the same or different yarns, such as Type 1 and Type 2 yarns, in order to achieve a lightweight, strong, and flexible textile.)

Yarns of Type 1 are defined for this invention as yarns having a traction modulus above about 30 GPa and/or tenacity above about 90 cN/Tex. Non-limiting examples of potential materials for Type 1 yarns include but are not limited to carbon (including but not limited to high modulus (HM) carbon or high strength (HS) carbon); polyethylene (including but not limited to high tenacity polyethylene (PE HT), high modulus polyethylene, high performance polyethylene, high strength polyethylene one example of each is Spectra®, UHMWPE (ultra high molecular weight polyethylene), one example of which is Dyneema®, a lightweight high strength oriented-strand gel); para-aramide fibers (including but not limited to Kevlar®, Twaron®, and Technora®); glass (including but not limited to S-glass, R-glass, and E-glass). Yarns of Type 1 are usually used for composites with rigid resins matrixes, for example epoxy, polyester, or rigid plastics matrixes, for example PPS, PEEK, PEI. The above examples are provided for detail and are not intended to be exhaustive or limiting in any way. Resultant materials are typically not drapable after curing at ambient temperature.

Yarns of Type 2 are defined for this invention as yarns having a breaking elongation above about 10% and/or tenacity between about 10-90 cN/Tex. Non-limiting examples of Type 2 yarns include but are not limited to meta-aramides such as Nomex® or Kermel®; polyamides (including but not limited to Pa 6.6 HT such as Enka® or Dupont® Nylon, Pa 6 HT such as Enkalon®, Pa 4.6 HP such as Stanylenka®; polyesters, including but not limited to PES HT (polyester high tenacity) such as Trevira®, Dacron®;

polyether ether ketone (PEEK), including but not limited to PEEK yarns manufactured by Zyex Ltd.; Teflon®, and polypropylene, including but not limited to PP HT (polypropylene high tenacity). Yarns of type 2 are usually used for flexible structures, and they may be used with flexible matrixes such as rubber matrixes, for example nitrile rubber (NBR), polychloroprene rubber (CR), chlorosulfonated polyethylene rubber (CSM), ethylene propylene diene monomer rubber (EPDM), epichlorohydrin (ECO), natural rubber (NR), styrene-butadiene rubber (SBR), butadiene rubber (BR, which is a synthetic rubber), fluorocarbon rubber (FPM), silicon rubber (MQ), or with of flexible plastic matrixes, for example polyurethane (PU) or polyvinyl chloride (PVC).

Standard crash resistant flexible tanks for aircraft use are currently typically made of yarns of type 2, most often from polyamide or polyester. Although these materials provide the desired crash resistance and tank flexibility, improvements are desired in order to decrease the weight of the tank, while giving equivalent performance values (meeting the required mechanical properties for puncture and crash/impact resistance). The present inventor has developed a hybrid textile of yarns from both Type 1 and Type 2, which allows for mass reduction (as compared to a standard 100% polyamide or polyester textile tank reinforcement). Although some hybrid textiles have been use for composite applications (such as composites of carbon fiber and Kevlar), these composites all use high modulus yarns of Type 1. There is not currently a hybrid textile manufactured from yarns of Type 1 and Type 2 twisted or woven together. This is primarily because the act of mixing yarns having very different properties makes their association improbable.

FIG. 1 illustrates a first yarn type 1 being twisted with a second yarn type 2 to create a hybrid composite yarn 14. The first yarn type 1 (a type 1 yarn) has a traction modulus above about 30 GPa and/or tenacity above about 90 cN/Tex), which helps to ensure high mechanical properties of the hybrid/composite yarn such as puncture resistance. The second yarn type 2 (a type 2 yarn) has a breaking elongation above about 10% and/or tenacity between about 10-90 cN/Tex), which helps to ensure energy absorption for crash resistance. This combination of features provide a hybrid composite yarn 14 having a blend of the desired features. FIG. 1 also shows that one or more composite yarns 14 may then be twisted together to create a multi-layer hybrid yarn 16. Three threads of hybrid composite yarn 14 are shown being spun/twisted together to form a three-ply layer hybrid yarn. It should be understood, however, that more or fewer yarns may be spin/twisted together in various combinations.

As mentioned above, although hybrid textiles currently exist, there is not currently a composite yarn or textile made from type 2 yarns twisted with type 1 yarns. Nor is there a textile woven from type 2 yarns woven with type 1 yarns. In one embodiment, the yarns used are of continuous filament yarns type.

The weight proportion of the yarns may vary, depending upon the particular properties desired. In one embodiment, yarns of type 1 may be chosen between 5 to 95% depending on the required specification, and the weight proportion of yarns of type 2 may be chosen between 5 to 95% depending on the required specification. The variations may change as desired, for example, it is possible to provide a hybrid textile with any of the proportions shown in the following table, as well as proportions therebetween (such as 7:93 or 22:78 or 73:27):

| % Type 1 Yarn | % Type 2 Yarn |
| --- | --- |
| 5 | 95 |
| 10 | 90 |
| 15 | 85 |
| 20 | 80 |
| 25 | 75 |
| 30 | 70 |
| 35 | 65 |
| 40 | 60 |
| 45 | 55 |
| 50 | 50 |
| 55 | 45 |
| 60 | 40 |
| 65 | 35 |
| 70 | 30 |
| 75 | 25 |
| 80 | 20 |
| 85 | 15 |
| 90 | 10 |
| 95 | 5 |

Figure 4:
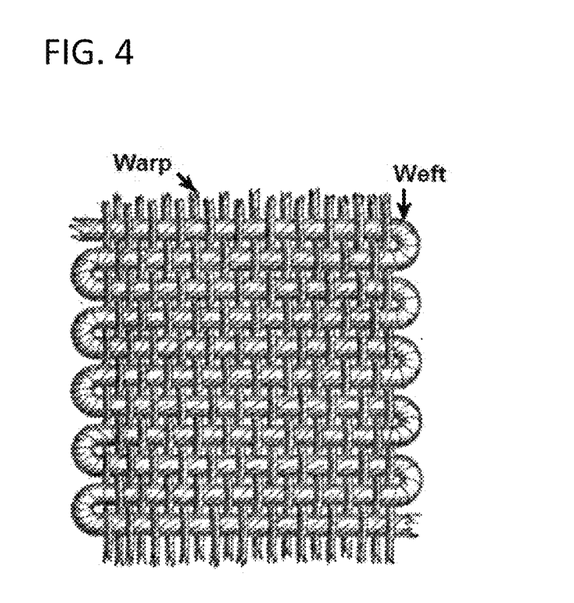
FIG. 4 shows a schematic of the warp and weft directions on a woven fabric.

A hybrid textile 18 can be produced by direct introduction in the weaving of yarns of type 1 and of yarns of type 2, as illustrated in FIG. 2. This pattern shows a combination of varying individual yarns between type 1 and type 2 in the warp and weft direction. Alternatively, a mixed/hybrid yarn 14, 16 may be used to create another type of textile 20, as shown in FIG. 3. FIG. 3 illustrates a textile 20 made of type 1 and type 2 yarns. In this particular example, a mixed yarn 14 or 16 is used in the warp direction. (As illustrated by the prior art weaving image of FIG. 4, the warp direction is generally the left to right direction on the page.) The lighter/yellow-colored yarns are para-aramide yarns of type 1 (their natural color), and the darker/black colored yarns are polyamide yarns of type 2 (which have been dyed).

Figure 5:
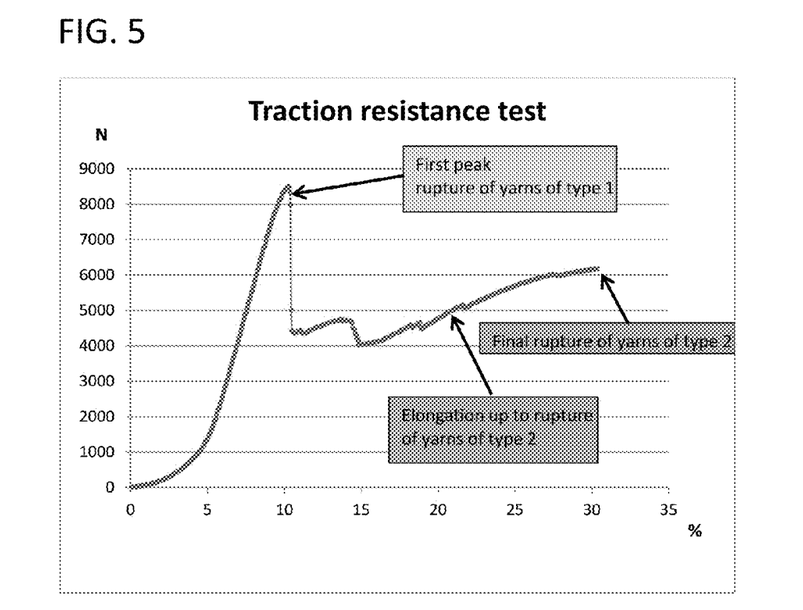
FIG. 5 shows a traction resistance test results.
Figure 6:
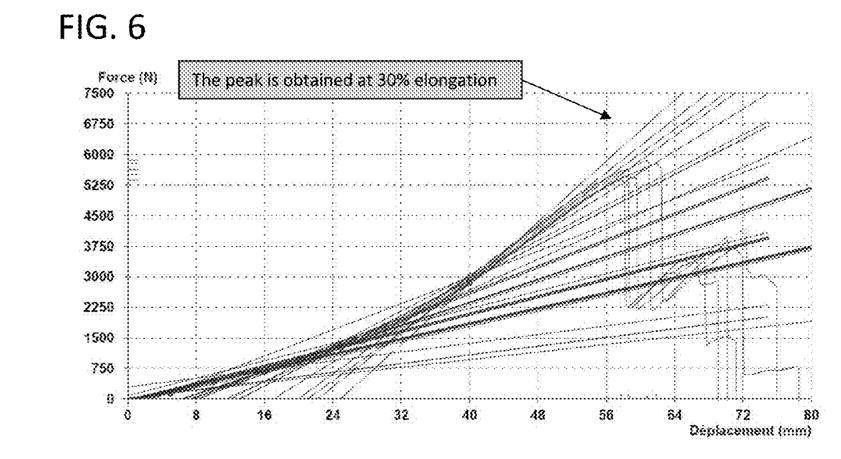
FIG. 6 shows similar traction resistance test results with a fabric having type 1 yarns with an increased crimp ratio.

Using the weaving armor textile 18 of FIG. 2 with individual yarns of type 1 and yarns of type 2, the traction resistance test of FIG. 5 shows a break in two steps. For the first peak, yarns of type 1 (lower elongation) break; then elongation up to rupture of yarns of type 2 is shown. By combining the two types of yarns, the benefits of both are received. However, the present inventors have also developed specific weaving armors that increase elongation of the first peak rupture of yarns of type 1, as shown in FIG. 6. The principle of these specifics armors is to have a high level of crimp for the yarn of type 1 and to keep a low level of crimp for the yarn of type 2.

The traction resistance curve shown in FIG. 6 (which plots force against displacement) illustrates that the peak before rupture can be extended to 30% elongation if the described weaving configurations are use. This type of traction resistance curve is better for crash resistance, because elongation is allowed before first break, and so the pressure induced by the crash is allowed to decrease with the volume increase.

Figure 7:
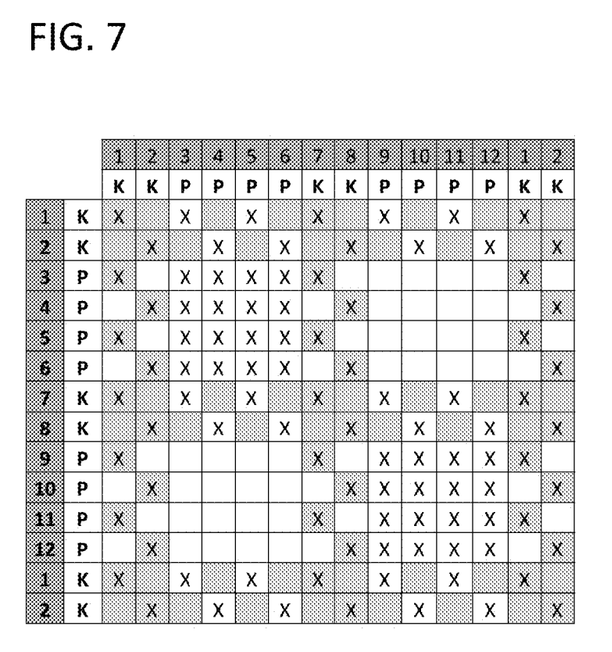
FIG. 7 shows one embodiment of a potential weaving pattern.
Figure 8:
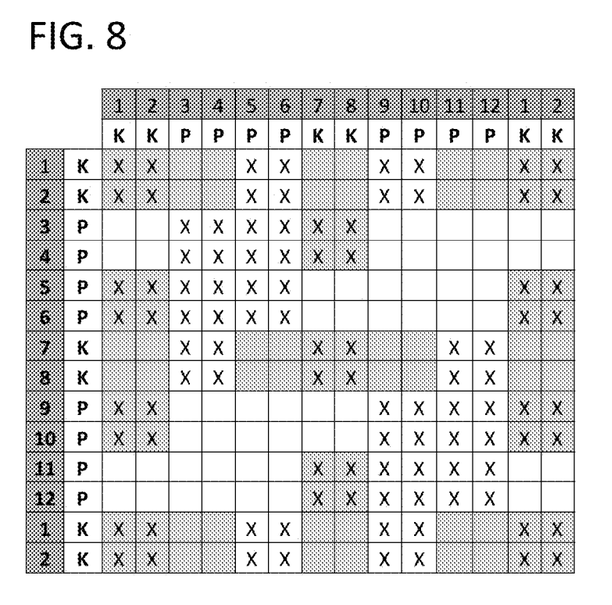
FIG. 8 shows an alternate embodiment of a potential weaving pattern.

Examples of specific armors that may be used to increase the crimp level of yarns of type 1 are illustrated by FIGS. 7 and 8. Without wishing to be bound to any theory, it is believed that having a higher crimp level for type 1 yarns, which causes the yarns to move up and down more in the weave pattern, strengthens them more such that they can elongate more before breaking By providing an increased length of type 1 yarn, there can be a greater elongation of the yarn prior to breakage. Thus, increasing the crimp of the type 1 yarn is believed to provide a greater strength to the ultimate textile created. In FIGS. 7 and 8, the "K" represents yarns of type 1, and "P" represents yarns of type 2. The X shows when the weft passes under the warp. The arrangement of FIG. 7 may be referred to as "Diamont." The arrangement of FIG. 8 may be referred to as "Brick." These arrangements are shown to illustrate the principle of crimp increase of yarn of type 1, but they are not intended to be exhaustive in any way. It should be understood that other arrangements based on the same principle can be developed and are within the scope of this invention and claims. The general concept to be protected is that there is a higher/greater/increased crimp of yarns of type 1 as opposed to yarns of type 2.

Figure 9:
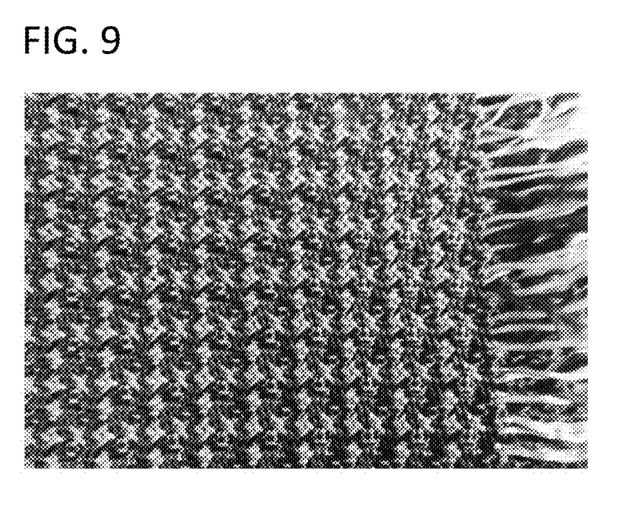
FIG. 9 shows one embodiment of a textile woven according to weaving pattern of FIG. 7.

Referring back to the specific configurations/arrangements shown and described, FIG. 9 shows an actual textile that has been woven using the configuration of FIG. 7, the "Diamond" configuration/arrangement. The lighter/yellow-colored yarns are para-aramide yarns of type 1, and the darker yarns are polyamide yarns of type 2. Although these weaving patterns are described and found particularly useful in connection with individual yarns of type 1 and type 2, with they may also be used with the novel hybrid composite yarns 14, 16.

Figure 10:
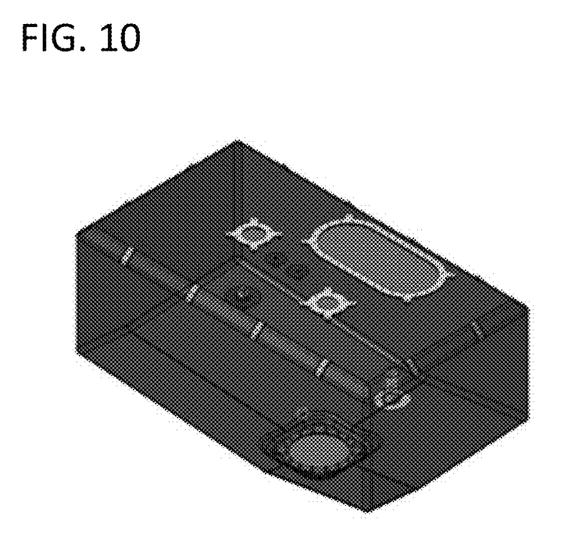
FIG. 10 shows a drawing of a flexible tank wall.
Figure 11:
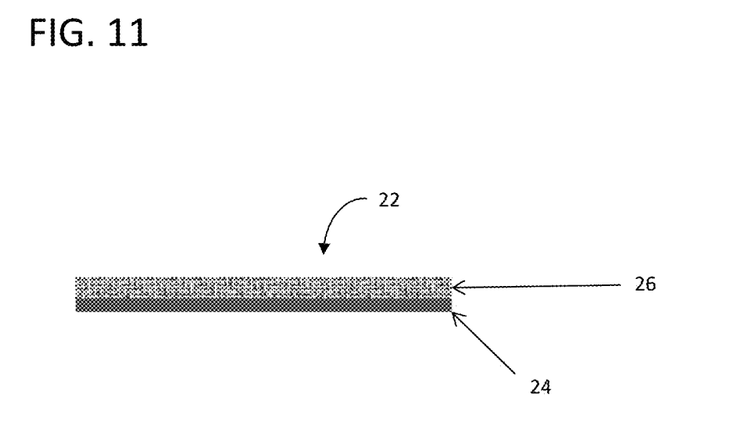
FIG. 11 shows a side cross sectional view of one embodiment of a flexible tank wall.

The textiles described herein are found to be particularly useful as reinforcement for a flexible tank wall, as shown in FIG. 10. Such tank are typically used for fuel, currently for crash-worthy helicopter fuel tanks, but the reinforcement textiles described herein may be used for other kind of fluid (liquid or gas) transportation or storage tanks. Non-limiting examples of other uses include but are not limited to aeronautical systems (aircrafts, airplanes, helicopters, fighter jets, shuttles), marine systems (boats, personal watercraft), trucks, armored vehicles or cars, or any transportation applications that may need impact/crash resistance for tanks The schematic of FIG. 11 shows a typical flexible tank wall structure 22, which has a flexible inner liner 24 for tightness and a single layer of a textile reinforcement 26. The textiles described above may be used as the textile reinforcement layer 26. For example, the textile reinforcement 26 may be manufactured as a hybrid textile, made from a combination of type 1 yarns and type 2 yarns. Additionally or alternatively, the reinforcement 26 could be formed as a woven fabric, a knitted fabric, a 3D textile structure as interlock (described in more detail below), velvet, or multi-layers textiles sewing. These are non-limiting examples only, and this list is not intended to be exhaustive.

Figure 12:
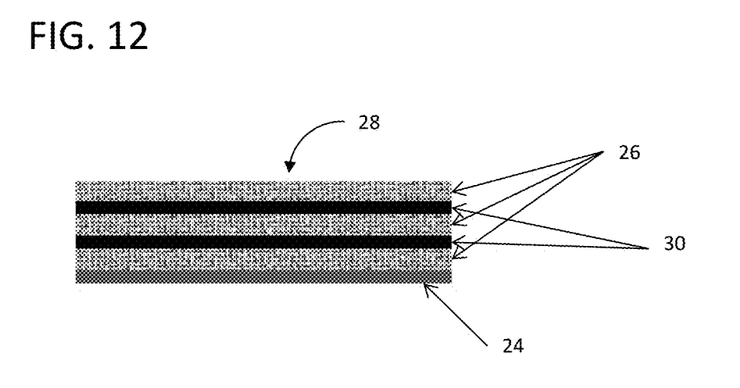
FIG. 12 shows a side cross sectional view of a multi-layer flexible tank wall.

In some embodiments, 3-D textile structures, such as various types of interlock configurations, can be used to obtain additional weight reduction for the higher level of performance requirements. These types of structures could ensure smoother surfaces by using lower TEX yarns (i.e., yarns having a lower linear mass density of fibers) and so decrease the coating weight necessary to bond the inner layer to the textile reinforcement. (However, that may not be the case with all weaving patterns. If a 2-D weaving/standard weaving pattern is used, then high tex yarn will generally be needed to achieve the mechanical properties needed because there is only one layer.) The use of 3-D structures can also help avoid the use of multilayer textile structures 28 when necessary, as shown in FIG. 12. The multi-layer textile 28 of FIG. 12 provides a flexible inner liner 24, with multiple reinforcement layers 26 bonded to one another via bonding layers 30. One downside of such a configuration is that the additional weight that reinforcement layers 26 and bonding layers 30 add to the system, as well as the additional complexity and steps required to manufacture the multi-layer structure 28. With the interlocking weaving patterns disclosed herein, the manufacturer can avoid the use of bonding layers between the textiles layers. However, the multi-layer 28 design is particularly useful for tank walls that must meet higher requirements (such as higher drop testing heights, for example).

Figure 13:
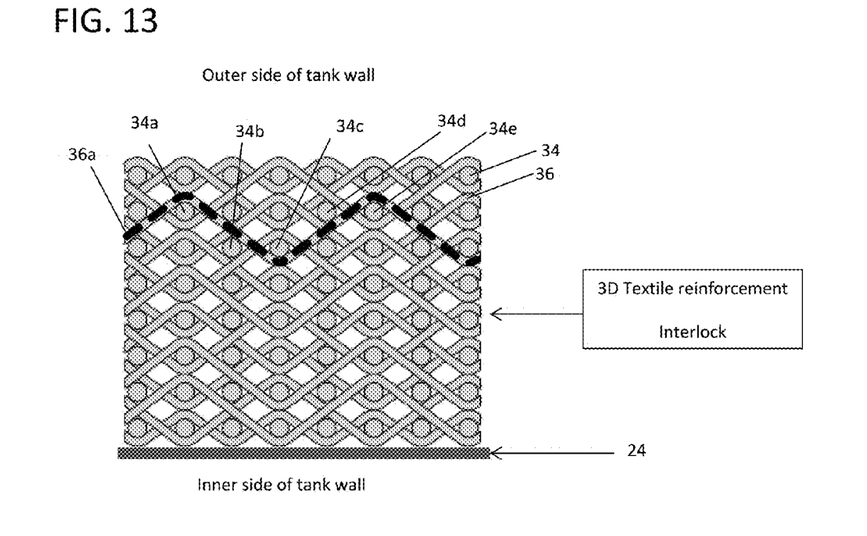
FIG. 13 shows a cross-sectional view of a 3-D fabric interlock pattern.

A further aspect of the invention provides a 3-D interlock configuration that may be used in either a single textile reinforcement layer 26 or for use with creating multiple layers of textile to be used in a multi-layer system 28. Various 3-D interlock materials have been used in the past (currently for bullet resistant clothes), but not as reinforcement textiles for flexible tanks FIG. 13 illustrates one embodiment of an interlock configuration 32. In this configuration, different layers of textiles are woven together. The round elements 34 in FIG. 13 illustrates the weft textile, and elongated textiles 36 illustrate the warp. As shown, a first warp direction textile 36a wraps around a first weft direction textile 34a and extends diagonally down at an angle past a second weft textile 34b in a lower row, and continues to extend down diagonally around a third weft textile 34c, wraps around that textile and extends diagonally back up past a fourth weft textile 34d, and wraps around a fifth weft textile 34e, and extends back down to begin the configuration again. Although one configuration of the warp textile has been shown, it should be understood that any other options are possible and within the scope of this invention. The warp textile may extend down past one, two, three, five, ten, or any number of weft textiles. By using different types of yarns for this weaving pattern and applying increasing levels of crimp to the type 1 yarn, improved textiles are achieved. The ultimate textile formed is then bonded to a flexible inner liner 24 to form a flexible tank wall.

Figure 14:
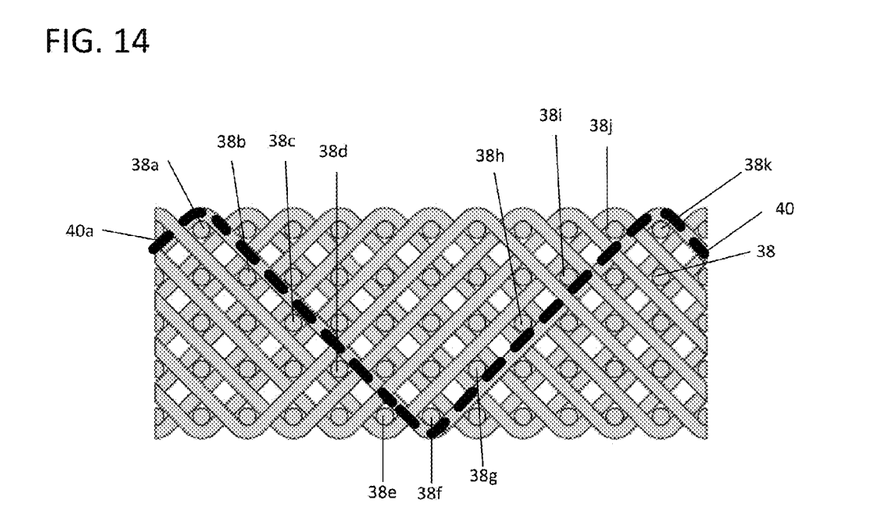
FIG. 14 shows a cross-sectional view of an alternate embodiment of a 3-D fabric interlock pattern.

FIG. 14 shows an alternate configuration of a 3-D textile structure. In this Figure, the round elements 38 illustrate the weft textile, and elongated textiles 40 illustrate the warp. As shown, a first warp direction textile 40a wraps around a first weft textile 38a and extends diagonally down at an angle past four weft textiles 38b, 38c, 38d, and 38e, and then wraps around than adjacent weft textile 38f, then extends diagonally back up past four more weft textiles 38g, 38h, 38i, 38j and wraps around an adjacent weft textile 38k, and extends back down to begin the configuration again. Further configuration of the weft and warp textiles are possible and within the scope of this invention.

Figure 15:
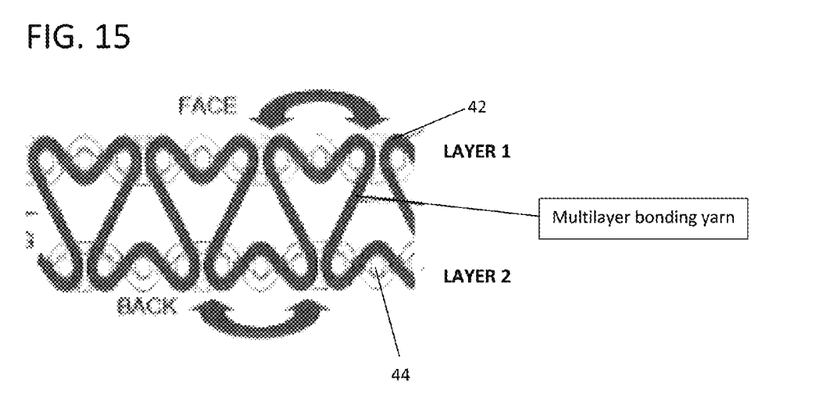
FIG. 15 shows a cross-sectional view of a further 3-D fabric velvet type pattern.

FIG. 15 shows an alternate form of weaving, which forms a velvet type of textile. In this Figure, a warp direction textile 42 creates a heart-shaped configuration as it navigates around the weft direction textiles 44, weaving in and out and up and down in the directions as shown. The 3-D weaving patterns shown and describe herein may be used with a combination of type 1 and type 2 yarns, but it may also be used with traditional yarn types.

If a multi-layer textile is desired, then one or more of the above 3-D textiles may be used, alone or in various combinations. The tank wall structure may also have additional layers, including but not limited to a vapor barrier to decrease the permeability (e.g., to decrease fuel permeability, for example), and conductive inner layer to achieve dissipation of electrostatic charges when needed (for example, for fuel transportation or storage) or a coating on the outer side of the wall, or a paint layer. Embodiments of the invention find particular use for helicopter crash resistant fuel tank, but it should be understood that they may be used for other tank walls as well.

In summary and to provide additional detail, the high modulus fiber content of the hybrid yarns described herein is designed to resist high mechanical stress of puncture resistance required for crash resistant tank wall according to CS27.963 and CS29.963, puncture resistance>370 pounds=168 daN. A hybrid textile tank wall made with one or more of the features described will allow energy dissipation which is necessary to comply with crash resistance as for drop test required for crash worthy helicopters fuel tank according to CS27.952 and CS29.952, 50 foot height=15 meters or MIL-T-27422 §4.5.8.2 65 foot height=20 meters. For the drop test of MIL-T-27422, which requires a higher absorption of energy, it is believed that perhaps the use of the hybrid textile combined with a 3D textile could be the best solution.

It could be desirable that the hybrid textile tank wall also comply with energy absorption required during dynamometer tear resistance test according to MIL-DTL-27422 §4.5.1. The hybrid textile tank wall could desirably also allows energy absorption which will be necessary to comply with impact penetration test according to MIL-DTL-27422 §4.5.2 and impact tear test according to MIL-DTL-27422 §4.5.3.

In a very specific embodiment, a textile for crash worthy fuel tank (15 meters drop test) may be made of around 37% in weight of para-aramide fiber and of around 63% in weight of polyamide 6.6 fiber. Para-aramide fibers have been preferred because of their higher thermal stability versus high tenacity polyethylene fibers, adhesion of rubber or plastic is also more difficult to achieve with polyethylene, because of their higher elongation at break compared to carbon fibers, and because of their higher tenacity at break compared to glass fibers.

Polyamide 6.6 fibers have been preferred because of the current use of such fibers for helicopter fuel tank applications and because adhesion with rubber or plastic is well known to be easily achieved.

Para-aramide pre-activated yarns such as Twaron 1014/1015 and Technora T202 (this is a non-exhaustive list) have been tested and found to achieve a good adhesion with rubber. They may be used in full association with polyamide because they will not need the additional primer treatment that is currently needed with these types of fibers.

Changes and modifications, additions and deletions may be made to the structures and methods recited above and shown in the drawings without departing from the scope or spirit of the invention and the following claims.

What is claimed is:

1. A flexible tank having a tank wall comprising a hybrid textile made of fibers of two different yarn types, the hybrid textile comprising:
   a. a first yarn type comprising a yarn that has a traction modulus above about 30GPa or tenacity above about 90 cN/Tex or both; and
   b. a second yarn type comprising a yarn that has a breaking elongation above about 10% or tenacity between about 10-90 cN/Tex or both,
   wherein the hybrid textile comprises a higher level of crimp for the yarn of the first type and a lower level of crimp for the yarn of the second type, wherein the hybrid textile is used to form the flexible tank wall.

2. The flexible tank of claim 1, wherein the first yarn type comprises carbon fibers.

3. The flexible tank of claim 1, wherein the first yarn type comprises high performance polyethylene fibers.

4. The flexible tank of claim 1, wherein the first yarn type comprises para-aramide fibers.

5. The flexible tank of claim 1, wherein the first yarn type comprises glass fibers.

6. The flexible tank of claim 1, wherein the second yarn type comprises meta-aramides fibers.

7. The flexible tank of claim 1, wherein the second yarn type comprises polyamides high tenacity fibers.

8. The flexible tank of claim 1, wherein the second yarn type comprises polyester high tenacity fibers.

9. The flexible tank of claim 1, wherein the second yarn type comprises polypropylene high tenacity fibers.

10. The flexible tank of claim 1, wherein the first yarn type and the second yarn type are twisted together to create a hybrid composite yarn.

11. The flexible tank of claim 1, wherein a plurality of hybrid composite yarns are twisted together to create a multi-layer hybrid yarn.

12. The flexible tank of claim 1, wherein the first yarn type comprises a para-aramide and the second yarn type comprises a polyamide.

13. The flexible tank of claim 1, wherein the hybrid textile is highly puncture resistant and highly crash/impact resistant.

14. The flexible tank of claim 1, wherein the textile is formed as a 2D, 3-D textile interlock, velvet, or multi-layer sewing structure for tank wall design.

15. The flexible tank of claim 1, wherein the first yarn type comprises from about 5 to about 95% of the textile and wherein the second yarn type comprises from about 5 to about 95% of the textile.

16. The flexible tank of claim 1, wherein the flexible tank comprises a crash resistant tank wall for liquid or gas transportation or storage.

17. The flexible tank of claim 1, wherein the first yarn type comprises a para-aramide yarn that is a pre-activated yarn comprising Twaron® 1014/1015 or Technora® T202.

18. The flexible tank of claim 1, wherein the second yarn type comprises Pa 6.6 HT, Pa 6 HT or Pa 4.6 HT.

19. The hybrid textile of claim 1, wherein the first yarn type comprises a para-aramide yarn that is a pre-activated yarn comprising Twaron® 1014/1015 or Technora® T202, and wherein the second yarn type comprises a polyamide yarn comprising nylon Pa 6.6 HT, Pa 6 HT, Pa 4.6 HT, or a polyester HT yarn.

20. The flexible tank of claim 1, wherein the first yarn type and the second yarn type are woven with a weaving pattern, wherein the weaving pattern comprises a higher level of crimp for the first yarn type and a lower level of crimp for the second yarn type.

21. The hybrid textile of claim 1, wherein the weaving pattern comprises the following pattern, wherein "K" represents the first yarn type and "P" represents the second yarn type:

|   |   | 1 K | 2 K | 3 P | 4 P | 5 P | 6 P | 7 K | 8 K | 9 P | 10 P | 11 P | 12 P | 1 K | 2 K |
|---|---|---|---|---|---|---|---|---|---|---|---|---|---|---|---|
| 1 | K | X |   | X |   | X |   | X |   | X |   | X |   | X |   |
| 2 | K |   | X |   | X |   | X |   | X |   | X |   | X |   | X |
| 3 | P | X |   | X | X | X | X | X |   |   |   |   |   | X |   |
| 4 | P |   |   | X | X | X | X | X |   | X |   |   |   |   | X |
| 5 | P | X |   | X | X | X | X | X |   |   |   |   |   | X |   |
| 6 | P |   |   | X | X | X | X | X |   |   |   |   |   |   | X |
| 7 | K | X |   | X |   | X |   | X |   | X |   | X |   | X |   |
| 8 | K |   | X |   | X |   | X |   | X |   | X |   | X |   | X |
| 9 | P | X |   |   |   |   |   | X |   | X | X | X | X | X |   |
| 10 | P |   | X |   |   |   |   |   | X | X | X | X | X |   | X |
| 11 | P | X |   |   |   |   |   | X |   | X | X | X | X | X |   |
| 12 | P |   | X |   |   |   |   |   | X | X | X | X | X |   | X |
| 1 | K | X |   | X |   | X |   | X |   | X |   | X |   | X |   |
| 2 | K |   | X |   | X |   | X |   | X |   | X |   | X |   | X. |

22. The hybrid textile of claim 1, wherein the weaving pattern comprises the following pattern, wherein "K" represents the first yarn type and "P" represents the second yarn type:

|   |   | 1<br>K | 2<br>K | 3<br>P | 4<br>P | 5<br>P | 6<br>P | 7<br>K | 8<br>K | 9<br>P | 10<br>P | 11<br>P | 12<br>P | 1<br>K | 2<br>K |
|---|---|---|---|---|---|---|---|---|---|---|---|---|---|---|---|
| 1 | K | X | X |   |   | X | X |   |   | X | X |   |   | X | X |
| 2 | K | X | X |   |   | X | X |   |   | X | X |   |   | X | X |
| 3 | P |   |   | X | X | X | X | X | X |   |   |   |   |   |   |
| 4 | P |   |   | X | X | X | X | X | X |   |   |   |   |   |   |
| 5 | P | X | X | X | X | X | X |   |   |   |   |   |   | X | X |
| 6 | P | X | X | X | X | X | X |   |   |   |   |   |   | X | X |
| 7 | K |   |   | X | X |   |   | X | X |   |   | X | X |   |   |
| 8 | K |   |   | X | X |   |   | X | X |   |   | X | X |   |   |
| 9 | P | X | X |   |   |   |   |   |   | X | X | X | X | X | X |
| 10 | P | X | X |   |   |   |   |   |   | X | X | X | X | X | X |
| 11 | P |   |   |   |   |   |   | X | X | X | X | X | X |   |   |
| 12 | P |   |   |   |   |   |   | X | X | X | X | X | X |   |   |
| 1 | K | X | X |   |   | X | X |   |   | X | X |   |   | X | X |
| 2 | K | X | X |   |   | X | X |   |   | X | X |   |   | X | X.|

* * * * *

UNITED STATES PATENT AND TRADEMARK OFFICE
CERTIFICATE OF CORRECTION

PATENT NO. : 9,617,665 B2  
APPLICATION NO. : 13/930054  
DATED : April 11, 2017  
INVENTOR(S) : Valérie Briand Page 1 of 1

It is certified that error appears in the above-identified patent and that said Letters Patent is hereby corrected as shown below:

On the Title Page

At Item (72), the inventor name "Briand Valérie" should be corrected to read -- Valérie Briand --

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*